United States Patent [19]

Brandes

[11] Patent Number: 5,502,362
[45] Date of Patent: Mar. 26, 1996

[54] ASYNCHRONOUS MACHINE WITH A SHORT-CIRCUIT ROTOR

[75] Inventor: Jürgen Brandes, Bad Neustadt, Germany

[73] Assignee: Siemens Aktiengesellschaft, München, Germany

[21] Appl. No.: 218,779

[22] Filed: Mar. 28, 1994

[30] Foreign Application Priority Data

Mar. 30, 1993 [DE] Germany ............. 43 10 320.0

[51] Int. Cl.⁶ .................... G05B 5/00
[52] U.S. Cl. .......... 318/471; 318/783; 318/778; 318/139
[58] Field of Search .............. 318/471, 139, 318/783, 778, 798, 445

[56] References Cited

U.S. PATENT DOCUMENTS

| | | | |
|---|---|---|---|
| 4,195,324 | 3/1980 | Waltz | 361/25 |
| 4,355,269 | 10/1982 | Burton et al. | 318/436 |
| 4,678,248 | 7/1987 | Depenbrock | 318/783 |
| 4,721,894 | 1/1988 | Graber | 318/471 |
| 4,914,329 | 4/1990 | Ottersbach | 310/68 |
| 5,113,824 | 5/1992 | Haubner | 318/471 |
| 5,138,182 | 8/1992 | Kokubu | 318/139 |
| 5,268,622 | 12/1993 | Philipp | 318/471 |
| 5,391,971 | 2/1995 | Yamada et al. | 318/778 |

FOREIGN PATENT DOCUMENTS

| | | |
|---|---|---|
| 1056252 | 4/1959 | Germany. |
| 2534123 | 2/1977 | Germany. |
| 3316234 | 11/1984 | Germany. |
| 0659673 | 10/1951 | United Kingdom. |

OTHER PUBLICATIONS

Patent Abstracts of Japan, vol. 9, No. 19, 25 Jan. 1985 & JP-A-59 165 979 (Hitachi Seisakusho K.K.), 19 Sep. 1984.
Machine Design, vol. 49, 1977, No. 7, E. R. Booser, R. C. Elwell: *Keeping Lubricants Flowing at Low Temperatures*, pp. 74–79.

Primary Examiner—William M. Shoop, Jr.
Assistant Examiner—Karen Masih
Attorney, Agent, or Firm—Kenyon & Kenyon

[57] ABSTRACT

An asynchronous machine uses a short-circuit rotor that is rotatably mounted by means of rolling bearings. Damage to the grease-lubricated bearings of the machine is prevented when the machine is started up in a temperature range below or near the freezing point by providing that: (1) before the machine is started and while the rotor is simultaneously locked, a voltage is applied, as a function of the temperature prevailing at the machine at its stator winding, of such magnitude that a current several times the rated machine current flows; and (2) when a certain temperature is reached at predefined parts of the machine or after a certain voltage application time, the current is switched off and the locking of the rotor is released.

30 Claims, 2 Drawing Sheets

ASYNCHRONOUS MACHINE WITH A SHORT-CIRCUIT ROTOR

BACKGROUND OF THE INVENTION

The present invention relates generally to asynchronous machines, and more particularly to an asynchronous machine with a short-circuit rotor that is rotatably mounted by means of rolling bearings.

The rolling bearings of such machines are generally lubricated with grease. In asynchronous motors, high temperatures are reached in the rotor and thus also at the bearings. Therefore, lubricating greases which ensure sufficient lubrication of the bearings, even at high bearing temperatures, must be used. Such lubricating greases have the disadvantage, however, that they become solid at low temperatures. At temperatures below or near the freezing point, such lubricating greases can become so solid that they completely lose their lubricating effect. If a motor is operated when such conditions are present, damage to the rolling bearings occurs. This can lead to complete failure of the motor, if not immediately, then eventually if the motor is repeatedly started up under the aforesaid conditions. Motors that are used outdoors, for example in electric vehicles, are particularly exposed to large temperature fluctuations.

The present invention is directed to the problem of developing an asynchronous machine of this kind in such a way that damage to the grease-lubricated bearings of the machine is prevented even if the machine is started up in a temperature range below or near the freezing point.

SUMMARY OF THE INVENTION

The present invention solves this problem by providing that before the machine is started and while the rotor is simultaneously locked, a voltage is applied, as a function of the temperature prevailing at the machine, for example at its stator winding, of such magnitude that a current several times the rated machine current flows, and that when a certain temperature is reached at predefined machine parts or after a certain voltage application time, the current is switched off and the rotor is released from the locked position.

Application of a suitable voltage to the stator winding induces in the short-circuit rotor a rotor current that leads to corresponding heating of the rotor and thus of the bearings as well. Since the rotor is locked, no rotation occurs at the bearings which might cause damage to them. The voltage is switched off, and the lock released, only when a temperature is reached at the bearings which no longer impairs the lubricating ability of the grease. The machine can then be operated by applying the operating voltage.

It is particularly advantageous to apply a single-phase alternating voltage to the machine, since then normally very little or no torque occurs at the rotor.

The machine can be monitored to permit starting by conveying the temperature values determined by at least one temperature sensor at the predefined machine parts to an electronic analysis unit, which emits corresponding control signals to a rotor locking device. The temperature of the corresponding machine bearings can be determined directly or indirectly by means of the temperature sensors. For example it is possible to draw conclusions as to the bearing temperature from temperature sensors arranged at the end windings of the machine. Thus temperature sensors that may be present in any case to monitor the machine can be used for startup monitoring.

Impermissible current levels during the preheating process can be eliminated if the magnitude of the currents flowing in the stator winding is also conveyed to the electronic analysis unit, and if a control element influencing the current magnitude is controlled by the electronic analysis unit. Since asynchronous machines are often operated in a regulated mode, current measurement devices are already present, so that controlling currents during the preheating process requires practically no additional outlay of circuitry.

In asynchronous machines installed in road vehicles, such as automobiles, subway trains, or commuter trains, the rotor can be locked by means of the existing vehicle brake. This eliminates the need for additional locking elements.

Since road vehicles are generally equipped with a vehicle battery, the machine is advantageously powered from said vehicle battery. A converter that can be controlled by the electronic analysis unit is provided as the control element between the battery and the stator winding.

The temperature at the machine bearings can be detected directly by means of temperature sensors arranged at the bearings of the machine.

DETAILED DESCRIPTION

Figure 1:
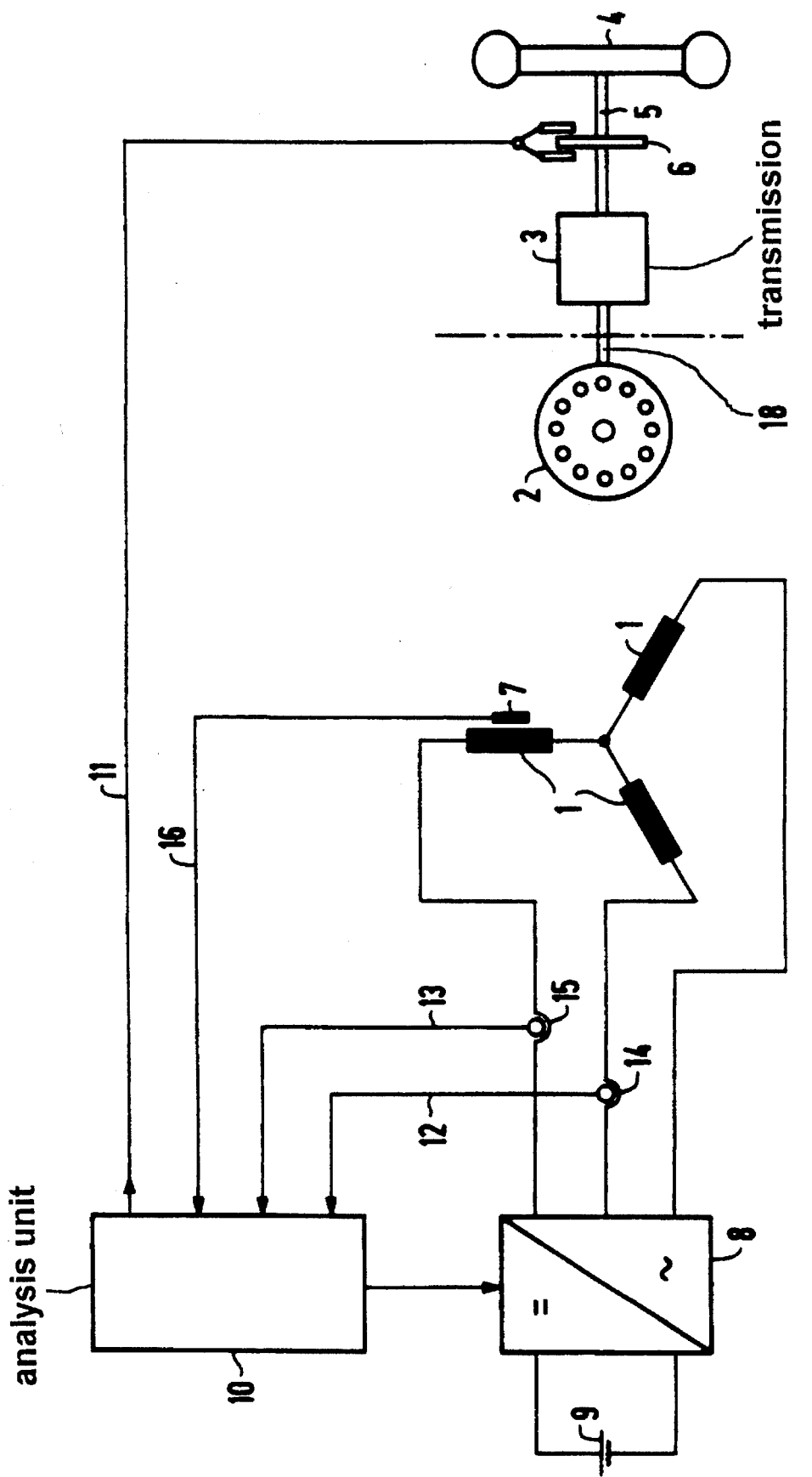
FIG. 1 shows a schematic circuit diagram of an asynchronous machine.
Figure 2:
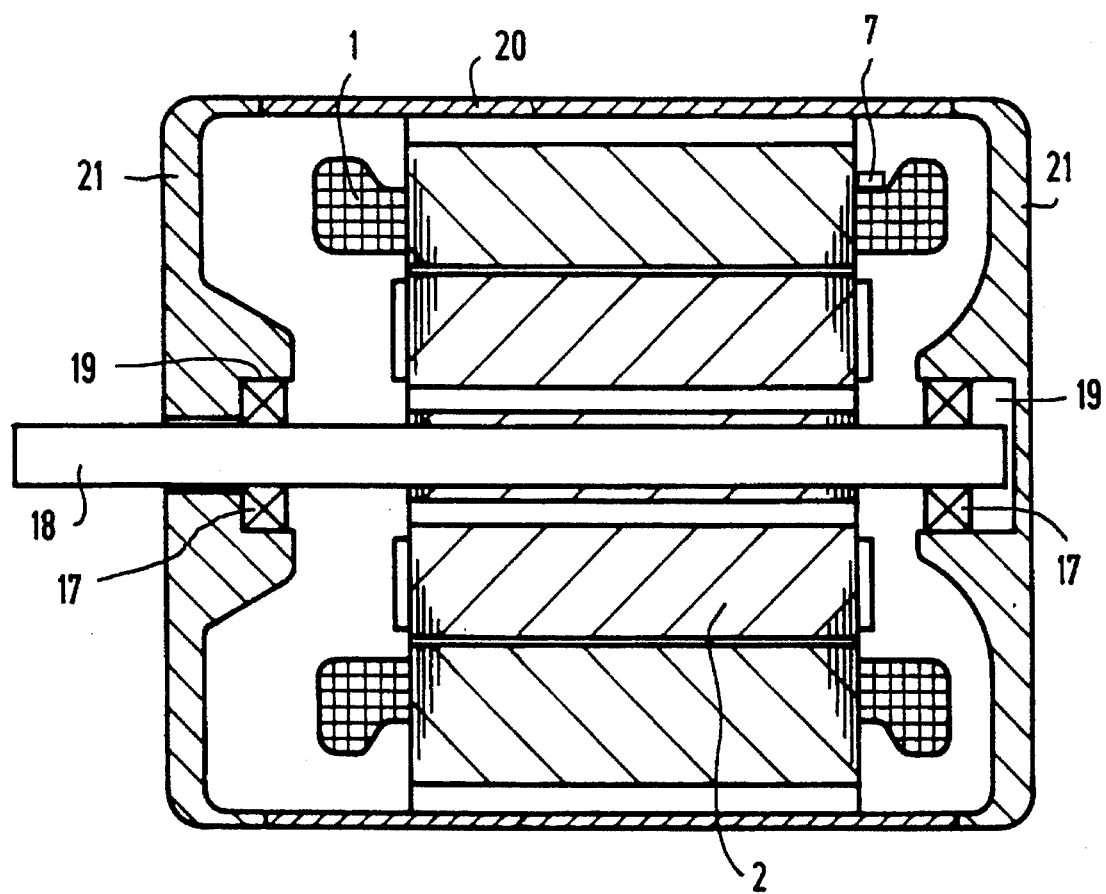
FIG. 2 shows an asynchronous machine in longitudinal section.

Element 1 designates the three-phase stator winding, and element 2 the rotor designates an asynchronous motor. Rotor 2 is coupled to a drive wheel 4 of an electric vehicle via a transmission 3. A vehicle brake 6 is arranged on shaft 5 of drive wheel 4. The rotor 2 of the asynchronous machine is rotatably supported with its shaft 18 in bearings 17. The bearings 17 are each inserted in a corresponding bearing opening 19 of the end shields 21 mounted to both end faces of the machine housing 20.

In the exemplary embodiment depicted, a temperature sensor 7 is associated with one phase of stator winding 1. This temperature sensor 7 is advantageously arranged physically at the end windings of the machine. In this case the temperature sensor can also be used to detect the operating temperature of the stator winding. Stator winding 1 is powered via a converter 8 from a vehicle battery 9. Converter 8 is controlled by an analysis unit 10.

The temperature values determined by temperature sensor 7 are conveyed to analysis unit 10 via a first control line 16. Analysis unit 10 also receives, via a second and third control line 12 and 13, the current values determined by current converters 14 and 15, arranged in the supply leads of at least two phase conductors of stator winding 1. Analysis unit 10 is connected to vehicle brake 6 via a fourth control line 11.

Before the asynchronous motor is started, the temperature values transmitted from temperature sensor 7 to analysis unit 10 are checked. When the asynchronous motor is cold, these values also correspond to the temperature at the motor bearings. Analysis unit 10 analyzes the transmitted temperature values. If the temperature detected is so low that the lubricating grease has insufficient lubricating ability, analysis unit 10 issues a locking command to vehicle brake 6 via fourth control line 16. Vehicle brake 6 is actuated and locks the drive system, i.e. rotor 2 of the asynchronous motor.

Analysis unit 10 also activates converter 8 so that an alternating voltage is supplied to stator winding 1. The alternating voltage thus applied to stator winding 1 induces in the short-circuit cage of rotor 2 a voltage that causes a current to flow in rotor 2. The magnitude of the alternating voltage is selected so that the current in rotor 2 is several times greater than the rated current. Rotor 2, and hence the bearings, therefore heat up quickly. It is also advantageous for the frequency of the applied alternating voltage to be made greater than the frequency of the operating voltage. For example, frequencies of more than 100 Hz for the alternating voltage have proven particularly favorable.

Normally no torque occurs at rotor 2 of the asynchronous motor when a single-phase alternating voltage is applied. At most, small torques may appear when asymmetries are present. Rotor 2 can easily be locked with respect to these torques by means of vehicle brake 6.

The time during which the alternating voltage is applied can be made dependent upon reaching a specific temperature measured by the built-in temperature sensor 7. A fixed time matched to the conditions of the asynchronous motor can also be defined. This is particularly necessary when temperature sensor 7 is also intended to detect the winding temperature of the machine during operation. Either after the corresponding temperature has been detected at the bearings or at a point on the motor at which the temperature is proportional to the bearing temperature, or after the defined time has elapsed, converter 8 is either switched off by analysis unit 10 or changed over directly to three-phase operation. At the same time, locking of the vehicle brake 6 is released by an appropriate control signal. Rotor 2 of the asynchronous motor can thus begin to rotate, and the vehicle can begin to move.

Preheating causes the lubricating grease in the bearings of the asynchronous motor to regain its lubricating ability, so that even at lower ambient temperatures the bearings are sufficiently lubricated as soon as the asynchronous motor first starts up, and are thus protected from damage.

What is claimed is:

1. An asynchronous machine comprising:
   a) at least two bearings;
   b) a stator winding;
   c) a short-circuit rotor being rotatably supported by means of said beatings and having a locking device for locking said rotor; and
   d) an analysis unit having a connecting line coupled to the locking device:
   e) at least one temperature sensor which measures a prevailing temperature at a predetermined machine part anal transmits measured temperature values to the analysis unit, which analysis unit, in dependence upon the measured temperature values, switches on and off a voltage to the stator winding and emits control signals via the connecting line to the locking device to lock and release the rotor, the switching on and off of the voltage, as well as the locking and release of the rotor being carried out in each case at temperature values preset for the analysis unit, by means of which analysis unit, moreover, a level of the voltage switched on to the stator winding is preset in such a way that a current flows in the stator winding which corresponds to several times a rated current of the machine.

2. The asynchronous machine according to claim 1, further comprising:
   a) a sensor sensing a magnitude of current flowing in the stator winding, and conveying the magnitude of the current to the analysis unit; and
   b) a control element controlling the magnitude of the current and under control of the analysis unit.

3. An asynchronous machine comprising:
   a) at least two bearings;
   b) a stator winding:
   c) a short-circuit rotor which is rotatably supported by means of the bearings and having a locking device for locking the rotor;
   d) an analysis unit having a connecting line Coupled to the locking device:
   e) at least one temperature sensor which measures a prevailing temperature at a predetermined machine part, said sensor transmitting measured temperature values to the analysis unit, which analysis unit, in dependence upon the measured temperature values, switches on a voltage to the stator winding and emits control signals via the connecting line to the locking device to release the locking of the rotor, by means of which analysis unit, moreover, a level of the voltage switched on to the stator winding is preset in such a way that a current flows in the stator winding which corresponds to several times the rated current of the machine.

4. The asynchronous machine according to claim 3, further comprising:
   a) a sensor sensing a magnitude of current flowing in the stator winding, and conveying the magnitude of the current to the electronic analysis unit; and
   b) a control element controlling the magnitude of the current and under control of the analysis unit.

5. An asynchronous machine for a road vehicle comprising:
   a) a plurality of rolling bearings;
   b) a stator winding;
   c) a short-circuit rotor being rotatably mounted by means of said plurality of rolling bearings;
   d) a brake locking and unlocking the rotor; and
   e) a controller having a connecting line coupled to the brake and applying a voltage to the stator winding, whereby before the machine is started and while the rotor is simultaneously locked, the controller applies a voltage to the stator winding, as a function of the temperature prevailing at the stator winding of the machine, of such magnitude that a current several times a rated machine current flows, and when a certain temperature is reached at predefined machine parts or after a predetermined time has elapsed, the controller switches off the current and releases the brake on the rotor by emitting a control signal to the brake via said connecting line.

6. The asynchronous machine according to claim 5, wherein said controller applies a single-phase alternating voltage to the stator winding.

7. The asynchronous machine according to claim 5, wherein the controller further comprises an analysis unit, the brake is coupled to the analysis unit, and said machine further comprises at least one temperature sensor sensing the temperature at predefined machine parts, and conveying the temperature to the analysis unit, wherein the analysis unit issues corresponding control signals to the brake to lock and unlock the rotor.

8. The asynchronous machine according to claim 6, wherein the controller further comprises an analysis unit, the brake is coupled to the analysis unit, and said machine further comprises at least one temperature sensor sensing the temperature at predefined machine parts, and conveying the temperature to the analysis unit, wherein the analysis unit issues corresponding control signals to the brake to lock and unlock the rotor.

9. The asynchronous machine according to claim 7, further comprising:
   a) a sensor sensing a magnitude of current flowing in the stator winding, and conveying the magnitude of the current to the analysis unit; and
   b) a control element controlling the magnitude of the current and under control of the analysis unit.

10. The asynchronous machine according to claim 8, further comprising:
    a) a sensor sensing a magnitude of current flowing in the stator winding, and conveying the magnitude of the current to the analysis unit; and
    b) a control element controlling the magnitude of the current and under control of the analysis unit.

11. The asynchronous machine according to claim 5, wherein the machine receives power from a vehicle battery, and said machine further comprises a converter under control of the analysis unit, and being provided as a control element between the vehicle battery and the stator winding.

12. The asynchronous machine according to claim 5, further comprising a temperature sensor disposed directly on the machine's bearings.

13. The asynchronous machine according to claim 11, further comprising a temperature sensor disposed directly on the machine's beatings.

14. A method for starting an asynchronous machine having a stator winding and a rotor mounted on rolling beatings, the method comprising the steps of:
    a) sensing a temperature at predefined parts of the machine;
    b) locking the rotor;
    c) applying a voltage to the stator winding before the machine is started and while the rotor is simultaneously locked, wherein said voltage is a function of the temperature prevailing at the stator winding of the machine, and the voltage has such magnitude that a current several times a rated machine current flows;
    d) switching off the current when a certain temperature is reached at predefined parts of the machine;
    e) releasing the rotor from its locked position after step d); and
    f) starting the machine after step e).

15. The method according to claim 14, wherein said step c) of applying a voltage further comprises applying a single-phase alternating voltage to the stator winding.

16. The method according to claim 14, further comprising the steps of:
    g) locking and unlocking the rotor with a locking device;
    h) sensing the temperature at predefined parts of the machine; and
    i) issuing corresponding control signals from an analysis unit to the locking device to lock and unlock the rotor based on the temperature at the predefined parts of the machine.

17. The method according to claim 16, further comprising the steps of:
    j) sensing a magnitude of current flowing in the stator winding;
    k) controlling the magnitude of the current with the analysis unit.

18. The method according to claim 14, further comprising the step of:
    g) sensing the temperature with a temperature sensor being disposed directly on the machine's bearings.

19. A method for starting an asynchronous machine of a road vehicle, said machine having a stator winding and a rotor mounted on rolling bearings, the method comprising the steps of:
    a) sensing a temperature at predefined parts of the machine;
    b) locking the rotor with the brake of the road vehicle;
    c) applying a voltage to the stator winding before the machine is started and while the rotor is simultaneously locked, wherein said voltage is a function of the temperature prevailing at the stator winding of the machine, and the voltage has such magnitude that a current several times a rated machine current flows;
    d) switching off the current when a certain temperature is reached at predefined parts of the machine or after a predetermined time has elapsed;
    e) releasing the brake after step d); and
    f) starting the machine after step e).

20. The method according to claim 19, further comprising the steps of:
    g) supplying power to the machine from the road vehicle battery;
    h) controlling the voltage supplied to the stator winding from the vehicle battery with a converter under control of the analysis unit.

21. The method according to claim 19, further comprising the step of:
    g) sensing the temperature with a temperature sensor being disposed directly on the machine's bearings.

22. An apparatus for preheating bearings of an asynchronous motor before starting the motor, said apparatus comprising:
    a) a battery providing dc current;
    b) a converter being coupled to the battery and converting the dc current to three phase ac current;
    c) a stator winding having three phases, having three supply leads, and receiving the three phase ac current from the converter via the three supply leads;
    d) a temperature sensor disposed at end windings of one of the three phases of the stator winding and sensing the operating temperature of the motor;
    e) an analysis unit being coupled to the temperature sensor and controlling the converter, wherein the temperature sensor provides temperature values of the operating temperature to the analysis unit;
    f) a first current converter being disposed in the supply lead of a first phase of the three phases of the stator winding, sensing a current value in the first phase of the three phases of the stator winding, and providing the current value of the first phase to the analysis unit;
    g) a second current converter being disposed in the supply lead of a second phase of the three phases of the stator winding, sensing a current value in the second phase of the three phases of the stator winding, and providing the current value of the second phase to the analysis unit;
    h) a rotor being electromagnetically coupled to the stator winding, wherein the stator winding induces a current to flow in the rotor when an alternating voltage is provided to the stator winding;

i) a brake locking the rotor and being coupled to the analysis unit, wherein the analysis unit issues commands to the brake to lock and release the brake, whereby if the temperature determined by means of a temperature sensor at a predetermined machine part is below a predetermined threshold the analysis unit issues a command to lock the brake, and provides an alternating voltage to the stator winding such that a current having a magnitude much greater than the rated current of the rotor flows in the short circuit winding of the rotor, thus heating the bearings of the motor.

23. A method for starting an asynchronous machine having a stator winding and a rotor mounted on rolling beatings, the method comprising the steps of:

a) sensing a temperature at predefined pans of the machine;

b) locking the rotor;

c) applying a voltage to the stator winding before the machine is started and while the rotor is simultaneously locked, wherein said voltage is a function of the temperature prevailing at the stator winding of the machine, and the voltage has such magnitude that a current several times a rated machine current flows;

d) switching off the current after a predetermined time has elapsed;

e) releasing the rotor from its locked position after step d); and f) starting the machine after step e).

24. The method according to claim 23, wherein step c) further comprises applying a single-phase alternating voltage to the stator winding.

25. The method according to claim 23, further comprising the steps of:

g) locking and unlocking the rotor with a locking device;

h) sensing the temperature at predefined pans of the machine; and i) issuing corresponding control signals from an analysis unit to the locking device to lock and unlock the rotor based on the temperature at the predefined pans of the machine.

26. The method according to claim 25, further comprising the steps of:

j) sensing a magnitude of current flowing in the stator winding;

k) controlling the magnitude of the current with the analysis unit.

27. The method according to claim 23, further comprising the step of:

g) sensing the temperature with a temperature sensor disposed directly on the machine's bearings.

28. A method for starting an asynchronous machine of a road vehicle, said machine having a stator winding and a rotor mounted on rolling beatings, the method comprising the steps of:

a) sensing a temperature at predefined parts of the machine;

b) locking the rotor with the brake of the road vehicle;

c) applying a voltage to the stator winding before the machine is started and while the rotor is simultaneously locked, wherein said voltage is a function of the temperature prevailing at the stator winding of the machine, and the voltage has such magnitude that a current several times a rated machine current flows;

d) switching off the current after a predetermined time has elapsed;

e) releasing the brake after step d); and f) starting the machine after step e).

29. The method according to claim 28, further comprising the steps of:

g) supplying power to the machine from the road vehicle battery;

h) controlling the voltage supplied to the stator winding from the vehicle battery with a converter under control of the analysis unit.

30. The method according to claim 28, further comprising the step of:

g) sensing the temperature with a temperature sensor disposed directly on the machine's bearings.

* * * * *